(12) United States Patent
Hatakeyama et al.

(10) Patent No.: US 12,009,705 B2
(45) Date of Patent: Jun. 11, 2024

(54) ELECTRIC BLOWER, VACUUM CLEANER, AND HAND DRYER

(71) Applicant: Mitsubishi Electric Corporation, Tokyo (JP)

(72) Inventors: Kazunori Hatakeyama, Tokyo (JP); Yuji Takayama, Tokyo (JP); Haruka Matsuo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 895 days.

(21) Appl. No.: 16/971,769

(22) PCT Filed: Mar. 23, 2018

(86) PCT No.: PCT/JP2018/011804
§ 371 (c)(1),
(2) Date: Aug. 21, 2020

(87) PCT Pub. No.: WO2019/180936
PCT Pub. Date: Sep. 26, 2019

(65) Prior Publication Data
US 2021/0091641 A1 Mar. 25, 2021

(51) Int. Cl.
*H02K 11/33* (2016.01)
*A47K 10/48* (2006.01)
(Continued)

(52) U.S. Cl.
CPC .............. *H02K 11/33* (2016.01); *A47K 10/48* (2013.01); *A47L 5/24* (2013.01); *A47L 9/22* (2013.01);
(Continued)

(58) Field of Classification Search
CPC ..... H02K 11/33; F04D 13/0686; F04D 25/06; F04D 25/068; F04D 29/5813; F04D 25/08; F04D 25/082
(Continued)

(56) References Cited

U.S. PATENT DOCUMENTS 4,751,872 A * 6/1988 Lawson, Jr. ....... H05K 7/20181
361/695
5,588,814 A * 12/1996 De Filippis ........... H02K 11/33
417/423.15
(Continued)

FOREIGN PATENT DOCUMENTS

CN 201142658 Y * 10/2008 ............. Y02B 40/00
JP H6-37594 U 5/1994
(Continued)

OTHER PUBLICATIONS

Office Action dated Jun. 29, 2021, issued in corresponding JP Patent Application No. 2020-507259 (and English machine translation).
(Continued)

*Primary Examiner* — Philip E Stimpert
(74) *Attorney, Agent, or Firm* — Posz Law Group, PLC

(57) ABSTRACT

An electric blower includes a fan, a motor to drive the fan, a first board including at least one switching element, and a second board including a microcomputer. The motor, first board, and second board are arranged in this order in a blowing direction of the fan.

14 Claims, 13 Drawing Sheets

(51) Int. Cl.

| | | |
|---|---|---|
| *A47L 5/24* | (2006.01) | |
| *A47L 9/22* | (2006.01) | |
| *A47L 9/28* | (2006.01) | |
| *F04D 25/06* | (2006.01) | |
| *F04D 25/08* | (2006.01) | |
| *F04D 29/58* | (2006.01) | |
| *H02K 3/52* | (2006.01) | |
| *H02K 5/20* | (2006.01) | |
| *H02K 9/06* | (2006.01) | |
| *H02K 11/215* | (2016.01) | |
| *H02K 21/16* | (2006.01) | |

(52) U.S. Cl.
CPC ............. *A47L 9/28* (2013.01); *F04D 25/06* (2013.01); *F04D 25/082* (2013.01); *F04D 29/5813* (2013.01); *H02K 3/522* (2013.01); *H02K 5/207* (2021.01); *H02K 9/06* (2013.01); *H02K 11/215* (2016.01); *H02K 21/16* (2013.01); *H02K 2211/03* (2013.01)

(58) Field of Classification Search
USPC ...................................................... 417/423.8
See application file for complete search history.

(56) References Cited

U.S. PATENT DOCUMENTS

| | | | | |
|---|---|---|---|---|
| 6,297,572 | B1* | 10/2001 | Sunaga | ............... F04D 25/0613 310/67 R |
| 7,611,553 | B2* | 11/2009 | Hato | .................. A47L 9/20 55/296 |
| 2001/0036409 | A1 | 11/2001 | Murata et al. | |
| 2007/0252487 | A1 | 11/2007 | Fujii et al. | |
| 2012/0234520 | A1* | 9/2012 | Pal | .................. H01F 27/085 165/121 |
| 2013/0052051 | A1 | 2/2013 | Clothier et al. | |
| 2015/0377480 | A1* | 12/2015 | Mitchell | ............. F21V 33/0096 362/96 |
| 2017/0021489 | A1* | 1/2017 | Bylund | ................. F04D 19/002 |

FOREIGN PATENT DOCUMENTS

| | | |
|---|---|---|
| JP | 2002-021794 A | 1/2002 |
| JP | 2002-048099 A | 2/2002 |
| JP | 2007-318987 A | 12/2007 |
| JP | 2009-278801 A | 11/2009 |
| JP | 2013-046569 A | 3/2013 |
| JP | 2014-015853 A | 1/2014 |

OTHER PUBLICATIONS

Japanese Office Action dated Mar. 2, 2021, issued in corresponding JP Patent Application No. 2020-507259 (and English Machine Translation).

Office Action dated May 8, 2021, issued in corresponding CN Patent Application No. 201880091389.1 (and English Machine Translation).

Office Action dated Dec. 29, 2021 in connection with counterpart Chinese Patent Application No. 201880091389 .1, and a machine English translation.

International Search Report of the International Searching Authority dated Jun. 26, 2018 for the corresponding International application No. PCT/JP2018/011804 (and English translation).

* cited by examiner

ELECTRIC BLOWER, VACUUM CLEANER, AND HAND DRYER

CROSS REFERENCE TO RELATED APPLICATION

This application is a U.S. national stage application of International Patent Application No. PCT/JP2018/011804 filed on Mar. 23, 2018, the disclosure of which is incorporated herein by reference.

TECHNICAL FIELD

The present invention relates to an electric blower, a vacuum cleaner, and a hand dryer.

BACKGROUND

In electric blowers, there is known a configuration in which a first board including a power circuit and a second board including a signal circuit are disposed between a fan and a motor, and both the boards are cooled by using airflow by the fan (see, e.g., Patent Literature 1).

There is also known a configuration in which a board is shielded from an airflow by a flange to prevent liquid carried by the airflow from adhering to the board (see, e.g., Patent Literature 2).

PATENT LITERATURE

Patent Literature 1: Japanese Patent Application Publication No. 2002-21794 (see paragraphs 0031-0033)

Patent Literature 2: Japanese Patent Application Publication No. 2013-46569 (see paragraph 0021)

However, in the configuration disclosed in Patent Literature 1, since the first and second boards are disposed between the fan and the motor, it is difficult for the airflow to reach the motor, and the motor may be insufficiently cooled. This can result in, for example, demagnetization of a rare-earth permanent magnet used in the motor.

Also, in the configuration disclosed in Patent Literature 2, since the airflow is blocked by the flange, a heat sink for cooling the board is provided between the board and a motor. Thus, the manufacturing cost can increase, and heat generated by the motor can transfer through the heat sink to the board.

SUMMARY

The present invention has been made to solve the above problems, and is intended to efficiently cool a board.

An electric blower of the present invention includes a fan; a motor to drive the fan; a first board including at least one switching element; and a second board including a microcomputer. The motor, first board, and second board are arranged in this order in a blowing direction of the fan.

With the present invention, since the motor, first board, and second board are arranged in this order in a blowing direction of the fan, it is possible to expose the first board including the at least one switching element, which generates a large amount of heat, to a large amount of airflow and cool it efficiently.

DETAILED DESCRIPTION

Embodiments of the present invention will be described in detail below with reference to the drawings. The present invention is not limited by the embodiments.

First Embodiment

<Configuration of Electric Blower 200>

Figure 1A:
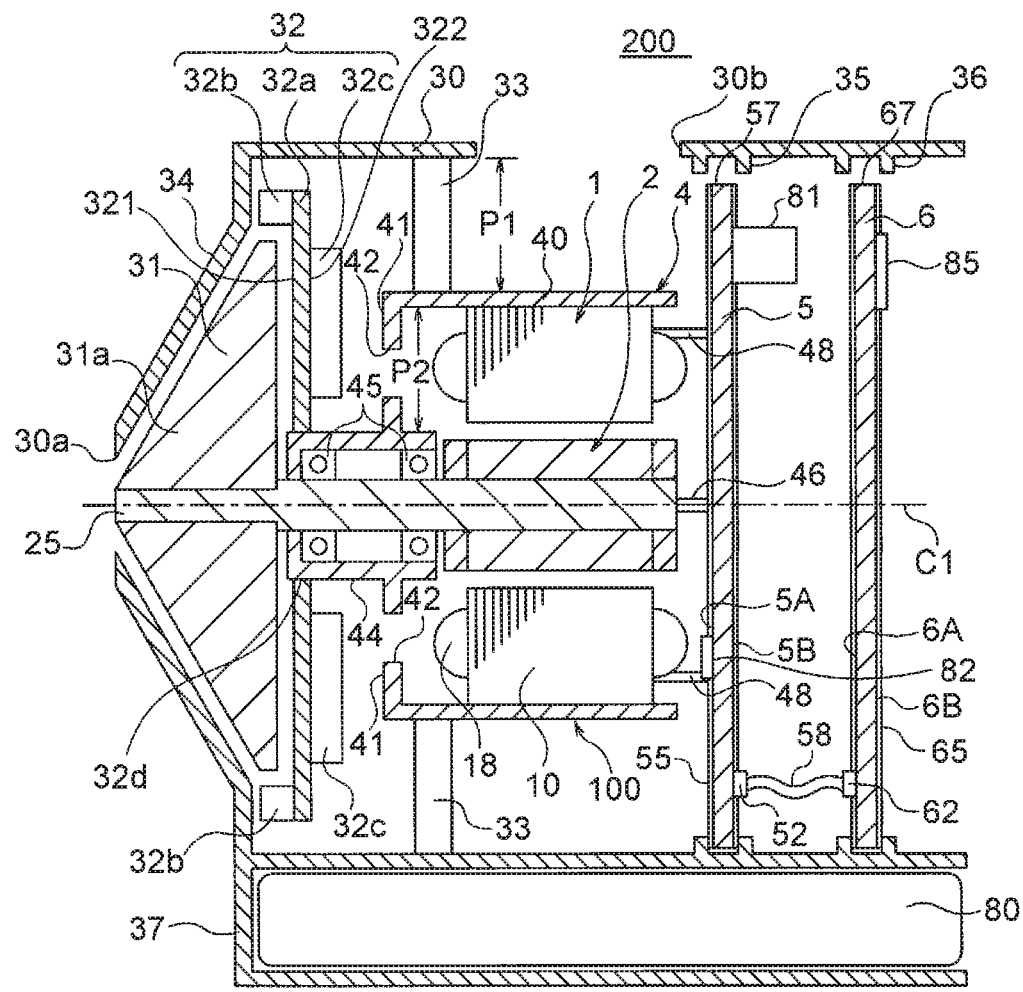
FIG. 1A is a longitudinal sectional view illustrating an electric blower of a first embodiment.

FIG. 1A is a longitudinal sectional view illustrating an electric blower 200 of a first embodiment of the present invention. The electric blower 200 includes a motor 100 including a rotating shaft 25, a rotor (fan) 31 attached to one end of the rotating shaft 25 of the motor 100, a stator 32 disposed adjacent to the rotor 31, a housing 30 that houses them, and a power board 5 (first board) and a control board 6 (second board) for controlling drive of the motor 100.

Hereinafter, a direction of an axis C1 that is a central axis of the rotating shaft 25 will be referred to as an "axial direction." A circumferential direction about the axis C1 will be referred to as a "circumferential direction." A radial direction about the axis C1 will be referred to as a "radial direction." A sectional view of a cross-section parallel to the axial direction will be referred to as a "longitudinal sectional view," and a sectional view of a cross-section perpendicular to the axial direction will be referred to as a "transverse sectional view."

Figure 1B:
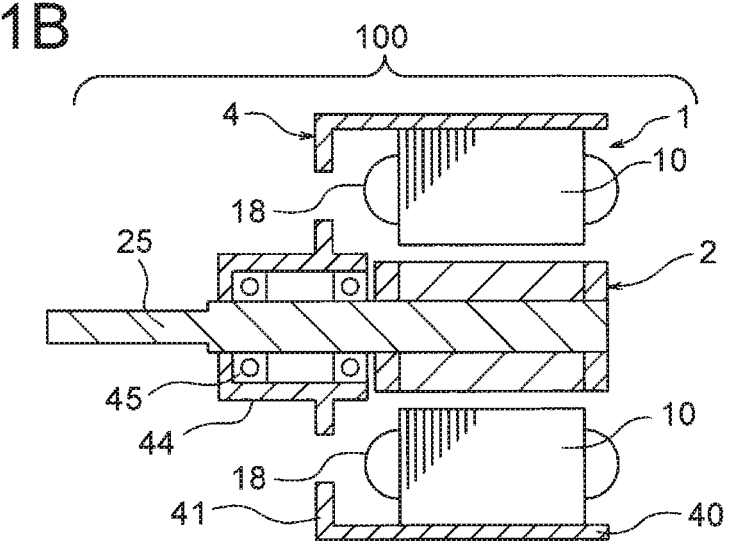
FIG. 1B is a longitudinal sectional view illustrating a motor thereof.

FIG. 1B is a longitudinal sectional view illustrating the motor 100 of the electric blower 200. The motor 100 is a permanent magnet synchronous motor, and is a single-phase motor driven by an inverter. The motor 100 includes a rotor 2 including the rotating shaft 25, a stator 1 disposed to surround the rotor 2, and a motor frame (also referred to simply as a frame) 4 inside which the stator 1 is fixed. A specific configuration of the stator 1 and rotor 2 will be described later.

Returning to FIG. 1A, the motor frame 4 includes a stator housing portion (or peripheral wall portion) 40, and a bearing housing portion 44 formed on the rotor 31 side of the stator housing portion 40. The stator housing portion 40 and bearing housing portion 44 both have cylindrical shapes about the axis C1. The stator 1 of the motor 100 is fitted to an inner side of the stator housing portion 40.

An outer diameter of the bearing housing portion 44 is smaller than an outer diameter of the stator housing portion 40. A wall portion 41 is formed between the stator housing portion 40 and the bearing housing portion 44. The wall portion 41 here extends in a direction perpendicular to the axis C1. A hole 42 that allows airflow to pass therethrough in the axial direction is formed in the wall portion 41.

Two bearings 45 (or bearing portions) are mounted inside the bearing housing portion 44. Outer races of the bearings 45 are fitted to an inner side of the bearing housing portion 44, and the rotating shaft 25 is press fitted in inner races of the bearings 45. The two bearings 45 are spaced from each other in the axial direction. A sleeve or the like may be disposed between the two bearings 45. The rotating shaft 25 projects through a hole formed in the bearing housing portion 44.

Figure 2:
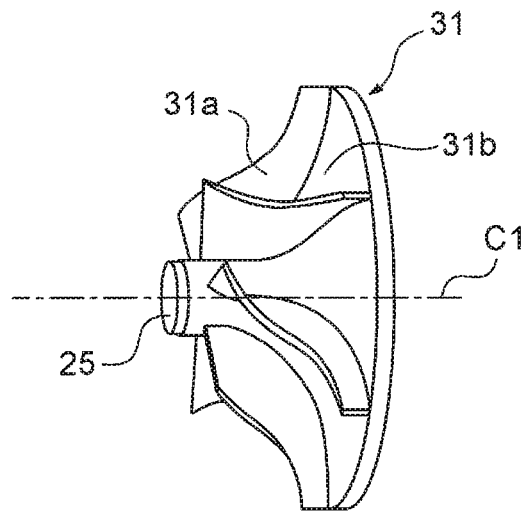
FIG. 2 is a perspective view illustrating a rotor of the first embodiment.

FIG. 2 is a perspective view illustrating an example in which the rotor 31 is a mixed flow fan. The rotor 31 illustrated in FIG. 2 includes multiple blades 31*a* on a surface of a hub 31*b* that is conical in shape about the axis C1. The rotor 31 generates airflow that is slanted relative to the axial direction and directed outward in the radial direction. The rotor 31 is not limited to a mixed flow fan, and may be, for example, a turbo fan.

Returning to FIG. 1A, the stator 32 includes a main plate 32*a* that is disk-shaped, multiple blades 32*b* formed on a first surface 321 of the main plate 32*a* on the rotor 31 side, and multiple air guide plates 32*c* (or air guides) formed on a second surface 322 on a side opposite the rotor 31. The stator 32 has, at its central portion in the radial direction, a hole 32*d*, and the bearing housing portion 44 is fitted in the hole 32*d*. The stator 32 is fixed by, for example, adhesion or screw fastening.

Figures 3A, 3B, 3C:
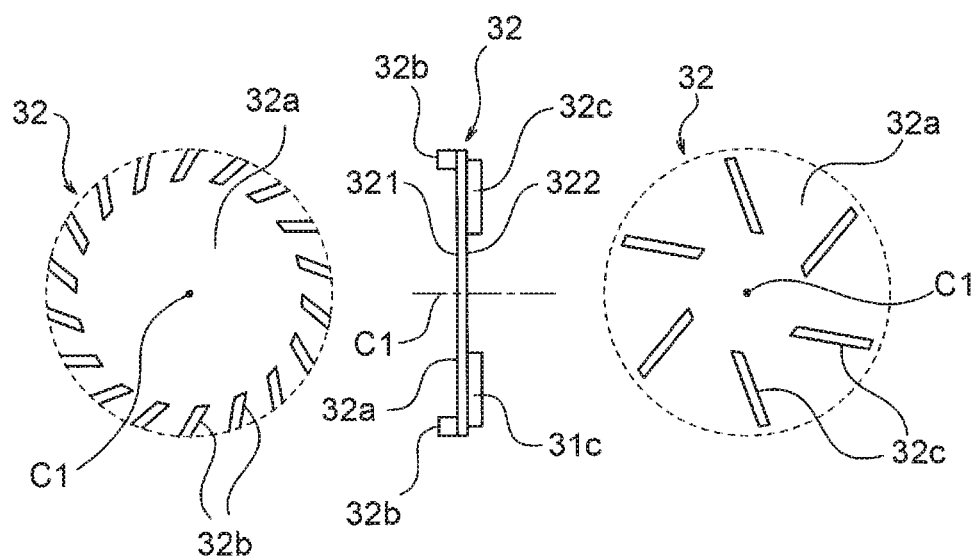
FIG. 3A is a view illustrating blades of a stator of the first embodiment.
FIG. 3B is a side view illustrating the stator.
FIG. 3C is a view illustrating air guide plates.

FIG. 3A is a view illustrating shapes and an arrangement of the blades 32*b* of the stator 32. FIG. 3B is a side view of the stator 32. FIG. 3C is a view illustrating shapes and an arrangement of the air guide plates 32*c* of the stator 32. FIGS. 3A and 3C each illustrate the shapes and arrangement as viewed from the rotor 31 side.

As illustrated in FIGS. 3A and 3B, the blades 32*b* are arranged at equal intervals in the circumferential direction, and each extend in a direction slanted relative to the radial direction. The blades 32*b* are formed in an outer peripheral region of the first surface 321, and located outside the rotor 31 (FIG. 2) in the radial direction. The blades 32*b* have the effect of rectifying airflow generated by rotation of the rotor 31.

As illustrated in FIGS. 3B and 3C, the air guide plates 32*c* are arranged at equal intervals in the circumferential direction, and each extend in a direction slanted relative to the radial direction. The slant direction of the air guide plates 32*c* is opposite the slant direction of the blades 32*b*. The air guide plates 32*c* extend inward beyond the blades 32*b* in the radial direction. The air guide plates 32*c* have the effect of directing airflow rectified by the blades 32*b* inward in the radial direction and guiding it toward the motor 100.

Returning to FIG. 1A, the electric blower 200 has a cantilever structure in which the rotating shaft 25 is supported by the two bearings 45 disposed between the rotor 31 and the stator 1 in the axial direction. The number of the bearings 45 is not limited to two, and may be three or more.

The housing 30 includes a fan cover 34 formed along the rotor 31, and an inlet 30*a* that faces a central portion of the rotor 31 in the radial direction. The housing 30 also includes at least one frame support 33 that supports the motor frame 4. Here, multiple frame supports 33 are disposed radially about the axis C1. An outlet 30*b* is formed in an outer peripheral wall of the housing 30, at a position facing an outer side in the radial direction of the stator 1.

The electric blower 200 has, as paths (or airflow paths) of airflow entering the housing 30 through the inlet 30*a*, a first airflow path P1 outside the motor frame 4 and a second airflow path P2 inside the motor frame 4. Airflow flowing through the first airflow path P1 passes through the outside of the motor frame 4 in the axial direction, and airflow flowing through the second airflow path P2 passes through the motor 100 in the axial direction.

The power board 5 and control board 6, which control drive of the motor 100, are disposed on a side of the motor 100 opposite the rotor 31. The power board 5 includes a front surface 5A (first surface) facing the motor 100 and a back surface 5B (second surface) opposite thereto. The control board 6 includes a front surface 6A (first surface) facing the power board 5 and a back surface 6B (second surface) opposite thereto.

The power board 5 and control board 6 include electronic parts necessary for control of drive of the motor 100. For example, the power board 5 includes switching elements 82*a* to 82*d* of an inverter 82, at least one electrolytic capacitor 81, and at least one shunt resistor 84, and the control board 6 includes a microcomputer 85. By separating the power board 5 and control board 6 as described above, it is possible to respond to downsizing of the motor 100.

The front surface 5A and back surface 5B of the power board 5 are coated with a coating 55 made of moisture proof material. Likewise, the front surface 6A and back surface 6B of the control board 6 are coated with a coating 65 made of moisture proof material.

The power board 5 is mounted in a board holding portion 35 provided in the housing 30. The board holding portion 35 is formed along an inner periphery of the housing 30, and holds an outer peripheral portion of the power board 5. Likewise, the control board 6 is mounted in a board holding portion 36 provided in the housing 30. The board holding portion 36 is formed along an inner periphery of the housing 30, and holds an outer peripheral portion of the control board 6. Cutouts 57 and 67 for allowing airflow to pass therethrough are provided in portions of the outer peripheral portions of the power board 5 and control board 6, respectively.

There are disposed, between the stator 1 and the power board 5, connecting terminals 48 for positioning and electrically connecting the stator 1 and power board 5, and a sensor guide 46 that guides lead wires of a sensor 16 (described later) of the motor 100.

A battery housing portion 37, which is a hollow portion, is formed on one side (a lower side in FIG. 1A) of the housing 30 in the radial direction. A battery 80 that is a driving source of the motor 100 is housed in the battery housing portion 37.

<Configuration of Motor 100>

Figure 4:
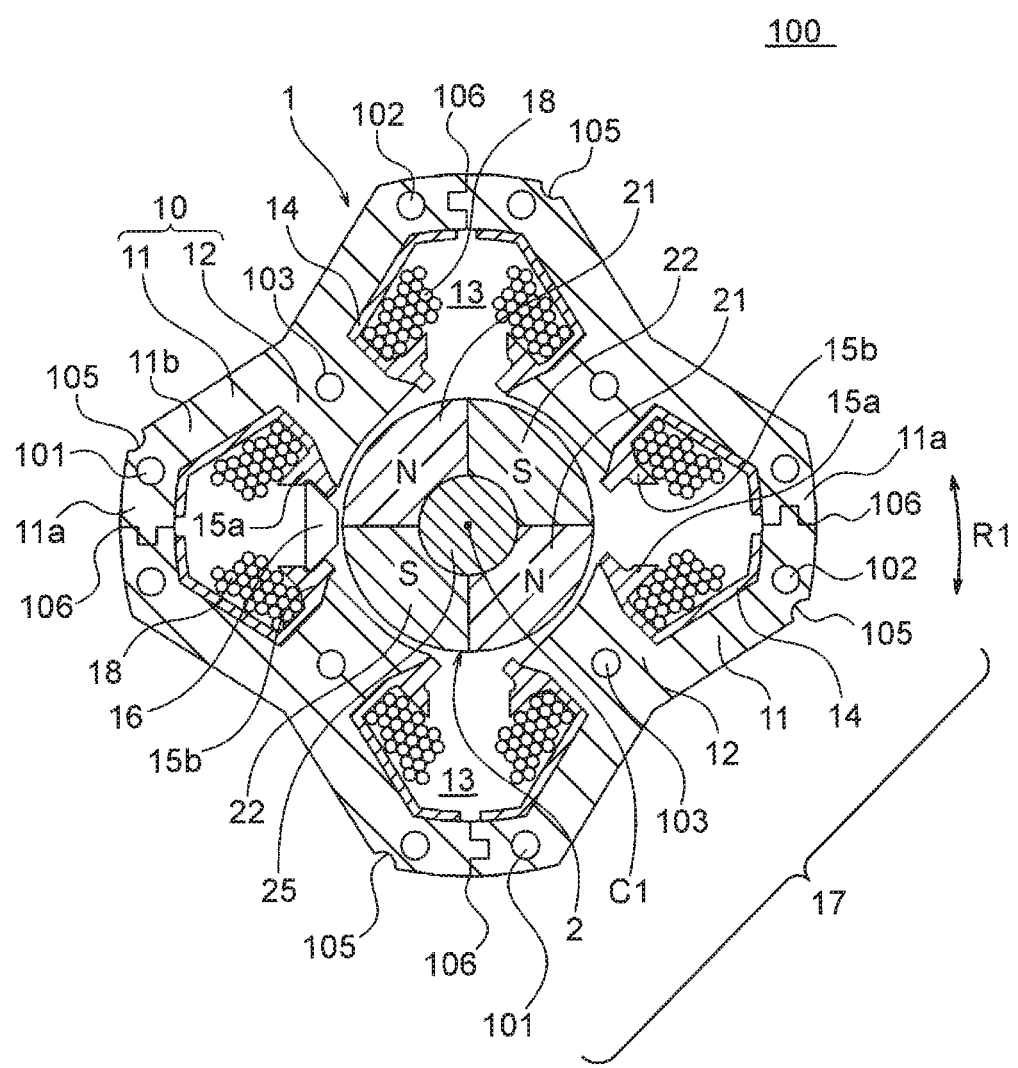
FIG. 4 is a transverse sectional view illustrating a motor (excluding a motor frame) of the first embodiment.

FIG. 4 is a sectional view illustrating the motor 100 of the first embodiment. In FIG. 4, the motor frame 4 is omitted. The motor 100 includes the rotor 2 and stator 1 disposed to surround the rotor 2, as described above. The rotor 2 rotates about the axis C1 counterclockwise in the drawing.

The rotor 2 includes the rotating shaft 25, and permanent magnets 21 and 22 fixed around the rotating shaft 25. The permanent magnets 21 and 22 are arranged at equal intervals in the circumferential direction, and each form a magnetic pole. Outer peripheries of the permanent magnets 21 are, for example, north poles, and outer peripheries of the permanent magnets 22 are, for example, south poles, but this may be reversed.

Here, the two permanent magnets 21 and two permanent magnets 22 are arranged alternately in the circumferential direction. Thus, the rotor 2 has four magnetic poles. However, the number of magnetic poles of the rotor 2 is not limited to four, and only required to be two or more.

The stator 1 is disposed outside the rotor 2 in the radial direction with an air gap therebetween. The stator 1 includes a stator core 10, insulators 14, and a coil 18. The stator core 10 is obtained by stacking multiple stacked elements in the axial direction and fixing them together at swaged portions 101, 102, and 103. The stacked elements are here electromagnetic steel sheets, and have thicknesses of, for example, 0.25 mm.

The stator core 10 includes a yoke 11 surrounding the rotor 2 and multiple teeth 12 each extending in a direction from the yoke 11 toward the rotor 2 (or inward in the radial direction). The teeth 12 are arranged at equal intervals in the circumferential direction. The number of the teeth 12 is equal to the number of magnetic poles of the rotor 2, and is four here.

In the stator core 10, a slot 13 is formed between each two of the teeth 12 adjacent to each other in the circumferential direction. The insulators 14, which are made of insulating resin, are disposed in the slots 13. The coil 18 is wound around the teeth 12 with the insulators 14 therebetween.

The yoke 11 of the stator core 10 includes multiple arc-shaped back yokes 11a, and linear connecting yokes (joint portions) 11b located inside the back yokes 11a in the radial direction. The back yokes 11a are portions of the stator 1 located outermost in the radial direction, and are arranged at equal intervals in the circumferential direction.

The number of the back yokes 11a is equal to the number of the teeth 12, and is four here. Each of the teeth 12 is located between two of the back yokes 11a adjacent to each other in the circumferential direction. Outer peripheries of the back yokes 11a are fitted to an inner periphery of the stator housing portion 40 of the motor frame 4 (FIG. 1A).

Each connecting yoke 11b extends to connect a back yoke 11a and a tooth 12. Each connecting yoke 11b linearly extends so that it extends inward in the radial direction as it extends away from the back yoke 11a. Each tooth 12 extends toward the rotor 2 from a portion where two of the connecting yokes 11b adjacent to each other in the circumferential direction are connected in V-shape (or a portion of the yoke 11 located innermost in the radial direction).

Split surfaces (or split fitting portions) 106 are formed at a center of each back yoke 11a in the circumferential direction. The stator core 10 is split into multiple blocks, or split cores 17, for the respective teeth 12 at the split surfaces 106 formed in the back yokes 11a. Here, the stator core 10 is split into four split cores 17.

The split surfaces 106 each have a projection or a recess. For each two of the split cores 17 adjacent to each other in the circumferential direction, a projection of a split surface 106 of one of the two split cores 17 and a recess of a split surface 106 of the other of the two split cores 17 are fitted together.

The multiple stacked elements constituting the stator core 10 are fixed together by the swaged portions 101, 102, and 103. The swaged portions 101 and 102 are formed in the yoke 11, and the swaged portions 103 are formed in the teeth 12.

Fixing recesses 105, which are grooves elongated in the axial direction, are formed in outer peripheries of the back yokes 11a of the yoke 11. In a state where the stator core 10 is engaged with the stator housing portion 40 (FIG. 1A) of the motor frame 4, portions of the stator housing portion 40 are pressed from the outer periphery side to be deformed and fitted into the fixing recesses 105. This prevents rotation of the stator 1 in the motor frame 4. The fixing recesses 105 can be omitted.

Figure 5A:
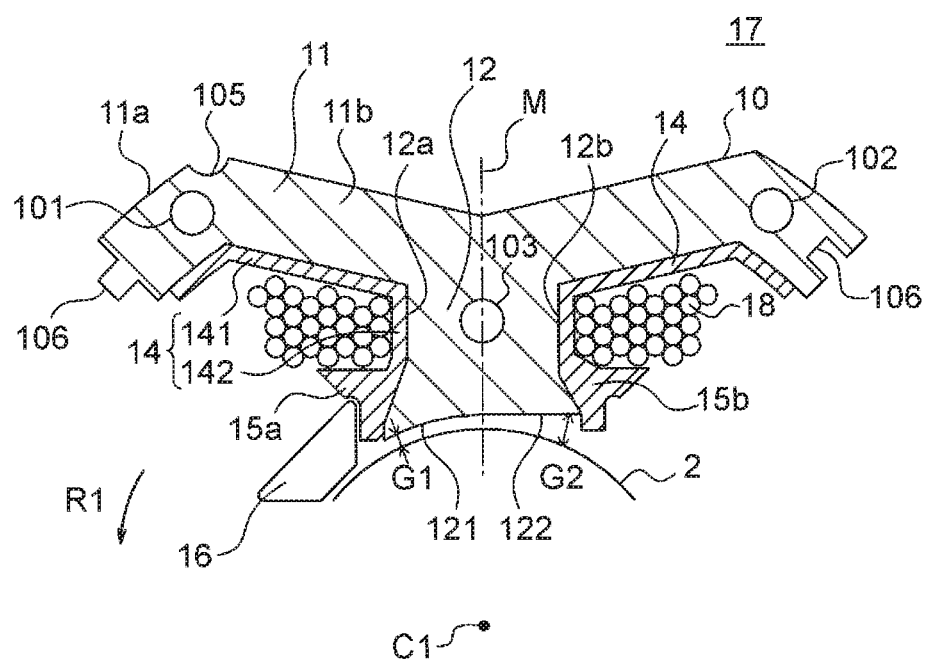
FIG. 5A is an enlarged view illustrating part of the motor of the first embodiment.

FIG. 5A is an enlarged view illustrating part of the stator 1. Each tooth 12 has a first side portion 12a that is an edge on the downstream side (left side in the drawing) in a rotational direction of the rotor 2, and a second side portion 12b that is an edge on the upstream side (right side in the drawing). The first side portion 12a and second side portion 12b each extend parallel to a straight line M in the radial direction passing through a center of the tooth 12 in the circumferential direction (or a center position between the side portions 12a and 12b in the circumferential direction).

An inner end (referred to below as a tip) of each tooth 12 in the radial direction has a shape asymmetric with respect to the straight line M. In particular, a leading edge of each tooth 12 facing the rotor 2 has a first leading edge 121 located on the downstream side in the rotational direction of the rotor 2, and a second leading edge 122 located on the upstream side.

The first leading edge 121 curves in an arc along an outer periphery of the rotor 2, and the second leading edge 122 linearly extends. The first leading edge 121 and second leading edge 122 are connected at a center of the tooth 12 in the circumferential direction. Thus, the distance between the tooth 12 and the rotor 2 is greater on the upstream side (distance G2) than on the downstream side (distance G1) in the rotational direction of the rotor 2.

Each insulator 14 includes an inner wall portion 141 along an inner surface of the yoke 11, and a side wall portion 142 surrounding a periphery (specifically, side portions 12a and 12b and both end surfaces in the axial direction) of a tooth 12. Each insulator 14 is formed by forming resin integrally with the stator core 10 or mounting, to the stator core 10, a resin formed body formed as a separate part.

Sensor fixing portions 15a and 15b are disposed on both sides of the tip of each tooth 12 in the circumferential direction. The sensor fixing portion 15a is disposed on the first side portion 12a side, and the sensor fixing portion 15b is disposed on the second side portion 12b side. The sensor fixing portions 15a and 15b each project in the circumferential direction from the tip of the tooth 12. Here, the sensor fixing portions 15a and 15b are formed integrally with the insulator 14. Specifically, the sensor fixing portions 15a and 15b are formed in such a manner as to be connected to the side wall portion 142 of the insulator 14.

Returning to FIG. 4, between each two of the teeth 12 adjacent to each other in the circumferential direction, sensor fixing portions 15a and 15b face each other. Here, the stator 1 includes four sets of sensor fixing portions 15a and 15b. The sensor (specifically, a magnetic pole position sensor) 16 for detecting the positions of the magnetic poles of the rotor 2 is held between the sensor fixing portions 15a and 15b of one of the four sets of sensor fixing portions 15a and 15b of the stator 1.

The sensor 16 is obtained by integrating a Hall effect device with a resin package, and has an end surface in the axial direction from which the lead wires are drawn. The sensor 16 is disposed to face the outer periphery of the rotor 2 so as to detect the positions of the magnetic poles from the magnetic field of the rotor 2. The sensor 16 is attached to a tip of the sensor guide 46 extending in the axial direction from the power board 5 toward the stator 1.

Figure 5B:
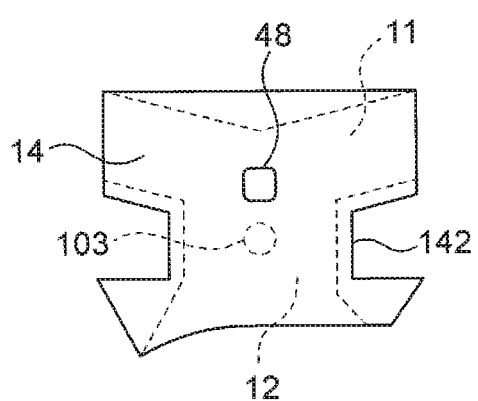
FIG. 5B is an enlarged view illustrating an insulator.

FIG. 5B is a schematic diagram illustrating a shape of an insulator 14 as viewed from the power board 5 side (FIG. 1A). A connecting terminal 48, which is made of metal (conductor) and projects toward the power board 5 (FIG. 1A), is disposed in a portion of the insulator 14 covering an end surface of the stator 1 in the axial direction. The connecting terminal 48 is fixed to the power board 5 with solder. The connecting terminal 48 positions the power board 5 with respect to the stator 1 and electrically connects the coil 18 of the motor 100 and a pattern of the power board 5.

Figure 6:
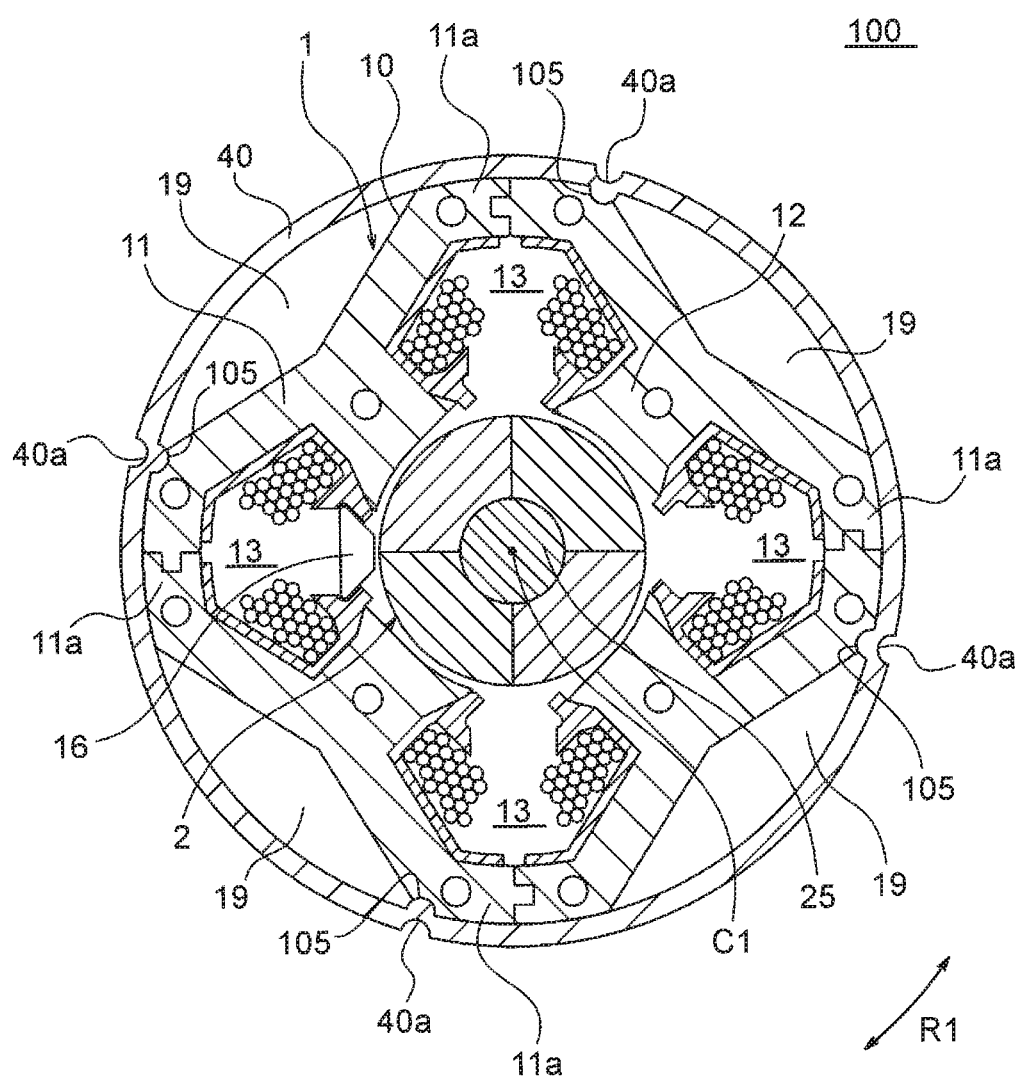
FIG. 6 is a transverse sectional view illustrating the motor of the first embodiment.

FIG. 6 is a transverse sectional view illustrating the motor 100. When the stator 1 is mounted in the motor frame 4 (FIG. 1A), the outer peripheries of the back yokes 11a of the stator 1 are fitted to the inner periphery of the stator housing portion 40. The stator 1 has the fixing recesses 105, and portions of the stator housing portion 40 corresponding to the fixing recesses 105 are applied with external force to be dented (as indicated by reference character 40a) and engaged with the fixing recesses 105. This can prevent displacement of the stator 1 in the circumferential direction.

In the example illustrated in FIGS. 4 to 6, the tip of each tooth 12 has a shape asymmetric with respect to the straight line M in the radial direction passing through a center in a width direction of the tooth 12, but such a shape is not mandatory, and it may have, for example, a shape symmetric with respect to the straight line M. Also, the yoke 11 of the stator core 10 is not limited to one having the back yokes 11a and connecting yokes 11b, and may be, for example, an annular yoke.

<Driving Device of Electric Blower 200>

Figure 7:
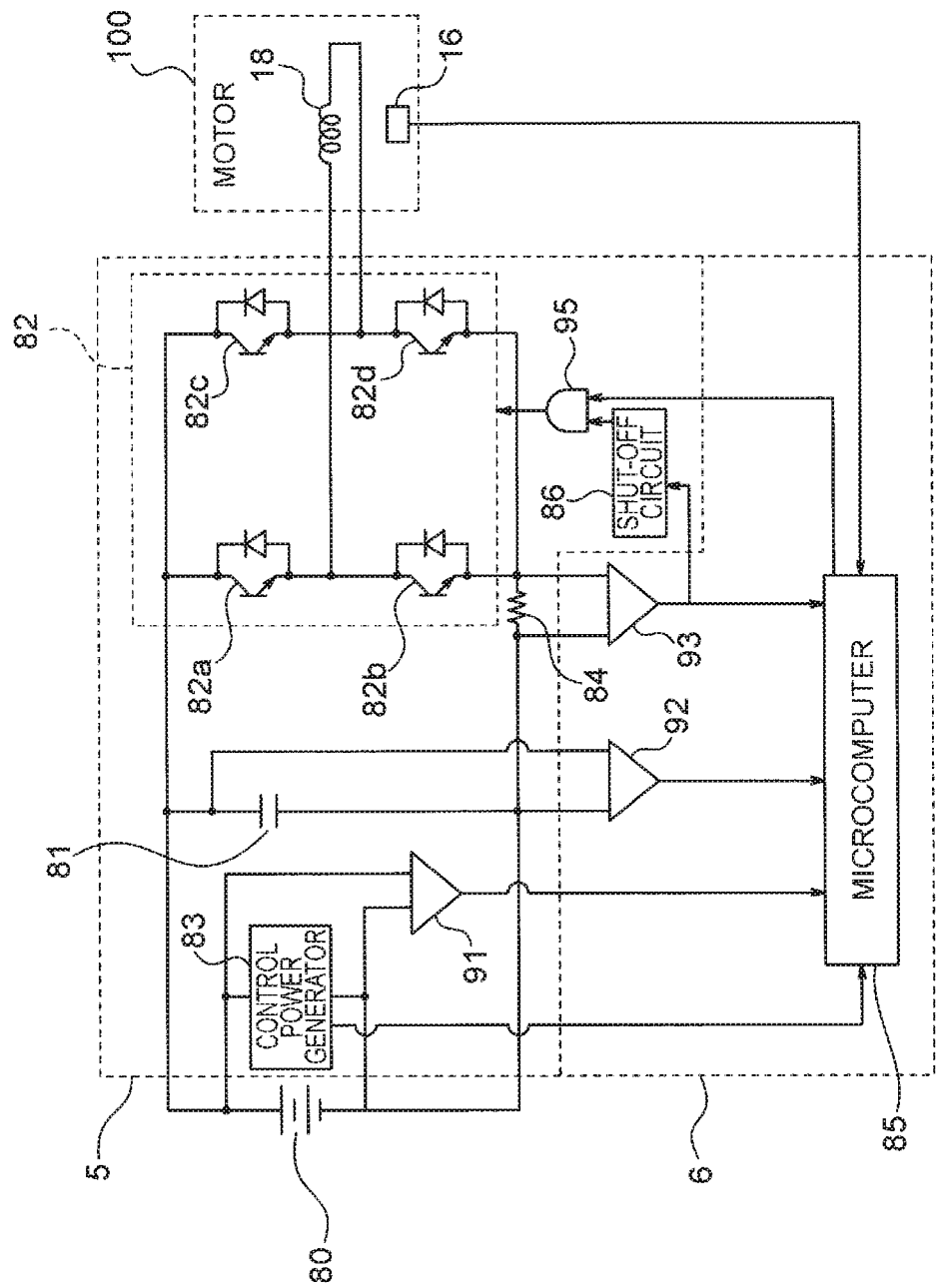
FIG. 7 is a block diagram illustrating a driving device of the electric blower of the first embodiment.

FIG. 7 is a block diagram illustrating a driving device of the electric blower 200 of the first embodiment. The driving device of the electric blower 200 includes the battery 80, the electrolytic capacitor 81, the inverter 82, a control power generator 83, the shunt resistor 84, the microcomputer 85 as a control device, a shut-off circuit 86, and voltage sensors 91, 92, and 93.

The battery 80 supplies a direct-current voltage (or battery voltage) of, for example, 20 V. The electrolytic capacitor 81 charges the voltage supplied from the battery 80 and supplies it to the inverter 82. The voltage sensor 91 detects the voltage of the battery 80, and the voltage sensor 92 detects the voltage of the electrolytic capacitor 81. Instead of the battery 80, an alternating-current power source and rectifying diode(s) may be used.

Using the voltage of the electrolytic capacitor 81, the inverter 82 performs switching operation and supplies voltage to the motor 100. Specifically, the inverter 82 includes the four switching elements 82a, 82b, 82c, and 82d arranged in an H-bridge. The switching elements 82a, 82b, 82c, and 82d perform on-off operation in accordance with driving signals from the microcomputer 85 to generate single-phase current and supply it to the motor 100.

The switching elements can be formed by, for example, insulated gage bipolar transistors (IGBTs) or metal-oxide-semiconductor field-effect transistors (MOSFETs). They can also be formed by MOSFETs with super junction structures, or SiC or GaN, which are wide band gap semiconductors.

The shunt resistor 84 is connected between the inverter 82 and the electrolytic capacitor 81. A voltage equal to the product of the current flowing through the shunt resistor 84 and the resistance occurs between both ends of the shunt resistor 84, and the voltage is detected by the voltage sensor 93. When excessive current flows through the shunt resistor 84, the voltage sensor 93 outputs a shut-off signal, and the shut-off signal is input to the microcomputer 85 and shut-off circuit 86.

The microcomputer 85 generates PWM signals, which are control signals, for on-off control of the switching elements 82a to 82d of the inverter 82, and outputs them to the inverter 82. The microcomputer 85 is obtained by mounting, on one chip, an arithmetic circuit that performs arithmetic processing necessary for control of the motor 100.

An output of the microcomputer 85 and an output of the shut-off circuit 86 are input to the inverter 82 via an AND circuit 95. When shut-off signals are output from the shut-off circuit 86 and microcomputer 85, the switching operation of the inverter 82 stops.

When the voltage of the electrolytic capacitor 81 decreases due to voltage supply to the motor 100, the voltage of the battery 80 is supplied to the electrolytic capacitor 81 and the voltage of the electrolytic capacitor 81 returns. Thus, the voltage detected by the voltage sensor 91 is substantially equal to the voltage detected by the voltage sensor 92. An output of the voltage sensor 91 and an output of the voltage sensor 92 (which are both analog signals) are input to the microcomputer 85.

Detecting the voltages of the battery 80 and electrolytic capacitor 81 with the voltage sensors 91 and 92 enables the microcomputer 85 to determine the voltage supplied to the inverter 82. The microcomputer 85 determines how the switching operation should be performed for the voltage supplied to the inverter 82. For example, when the voltage supplied to the inverter 82 is 20 V and a voltage of 10 V is supplied to the motor 100, the inverter 82 is turned on at a duty cycle of 50%.

The control power generator 83 is connected in parallel to the battery 80. The control power generator 83 generates a control voltage (e.g., 5 V) used by the microcomputer 85 or the like, from the voltage (e.g., 20 V) of the battery 80.

Figure 8:
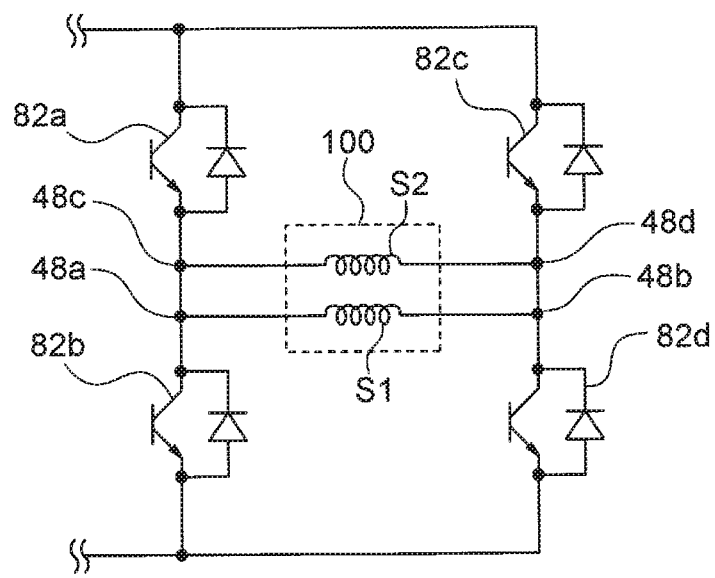
FIG. 8 is a diagram illustrating an electrical connection of switching elements and the motor of the first embodiment.

FIG. 8 is a diagram illustrating an electrical connection of the inverter 82 and motor 100. In the inverter 82, a series connection of the switching elements 82a and 82b and a series connection of the switching elements 82c and 82d are connected in parallel.

The coil 18 of the motor 100 includes two coil portions (denoted by S1 and S2 in FIG. 8) connected in parallel. The coil portion S1 is connected to the switching elements 82a and 82b at a connecting terminal 48a, and connected to the switching elements 82c and 82d at a connecting terminal 48b. The coil portion S2 is connected to the switching elements 82a and 82b at a connecting terminal 48c, and connected to the switching elements 82c and 82d at a connecting terminal 48d. The connecting terminals 48a to 48d will be described later.

For example, when the switching elements 82a and 82d are simultaneously turned on, current flows through the switching element 82a, motor 100, switching element 82d, and shunt resistor 84 in this order. Also, when the switching elements 82b and 82c are simultaneously turned on, current flows through the switching element 82c, motor 100, switching element 82b, and shunt resistor 84 in this order.

Of the electronic parts illustrated in FIG. 7, the inverter 82 (i.e., the switching elements 82a to 82d) generates a large amount of heat, and thus is provided in the power board 5, which is exposed directly to the airflow flowing through the first airflow path P1 and second airflow path P2. Also, while the microcomputer 85 generates a small amount of heat, it has a narrow wiring pitch, and it is required to prevent foreign matter (especially liquid) from adhering to the microcomputer 85. Thus, the microcomputer 85 is provided in the control board 6 downstream of the power board 5.

Since the electrolytic capacitor 81 and shunt resistor 84 are applied with relatively high voltages and carry relatively high currents, they are desirably provided in the power board 5, which is exposed directly to the airflow.

Each of the control power generator 83, shut-off circuit 86, voltage sensor 91, voltage sensor 92, and AND circuit 95 may be provided in either the power board 5 or control board 6.

However, providing the voltage sensor 93, shut-off circuit 86, and AND circuit 95 for overcurrent protection in the power board 5 as with the shunt resistor 84 and inverter 82 provides an advantage of allowing the wiring length to be reduced. Also, since the control power generator 83 supplies the control voltage to the microcomputer 85, it may be provided in the control board 6 as with the microcomputer 85.

FIGS. 9A, 9B, 9C, and 9D are schematic views illustrating an example of an arrangement of the electronic parts in the power board 5 and control board 6. They illustrate major ones of the electronic parts illustrated in FIG. 7. FIGS. 9A to 9D illustrate the power board 5 and control board 6 with the battery 80 side (FIG. 1A) down.

Figure 9A:
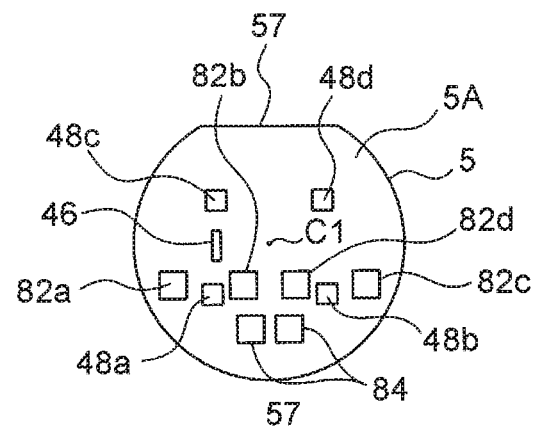
FIGS. 9A-9D are schematic views illustrating an example of an arrangement of electronic parts on a front surface (FIG. 9A) and a back surface (FIG. 9B) of a power board and a front surface (FIG. 9C) and a back surface (FIG. 9D) of a control board, in the first embodiment.

FIG. 9A is a schematic view illustrating an example of an arrangement of electronic parts on the front surface 5A (or a surface on the motor 100 side) of the power board 5. The connecting terminals 48 to the motor 100, the sensor guide 46, the switching elements 82a, 82b, 82c, and 82d of the inverter 82, and the at least one shunt resistor 84 are arranged on the front surface 5A of the power board 5.

The connecting terminals 48 are fixed to the power board 5 with solder, as described above. Here, the number of the connecting terminals 48 is four, and they are denoted by reference characters 48a, 48b, 48c, and 48d. The connecting terminals 48a to 48d are arranged at positions corresponding to the four corners of a square, but such an arrangement is not mandatory. The number of the connecting terminals 48a to 48d is not limited to four, and may be three or less or five or more.

The sensor guide 46 is disposed between the two connecting terminals 48a and 48c, which are adjacent to each other in the circumferential direction, and is disposed at equal distances from the connecting terminals 48a and 48c. Disposing the sensor guide 46 at equal distances from the connecting terminals 48a and 48c as described above prevents displacement of the sensor 16 (FIG. 4), which is disposed at the tip of the sensor guide 46, in the circumferential direction.

The switching elements 82a to 82d are arranged in a row, the connecting terminal 48a is located between the switching elements 82a and 82b, and the connecting terminal 48b is located between the switching elements 82c and 82d. However, such an arrangement is not mandatory.

Here, the number of the at least one shunt resistor 84 is two, but may be one or three or more. A positional relationship between the switching elements 82a to 82d and the shunt resistors 84 will be described later.

Figure 9B:
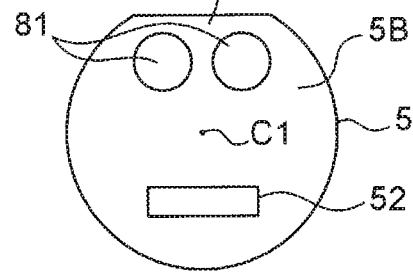

FIG. 9B is a schematic view illustrating an example of an arrangement of electronic parts on the back surface 5B (or a surface on a side opposite the motor 100) of the power board 5. The at least one electrolytic capacitor 81 is disposed on the back surface 5B of the power board 5. Here, the number of the at least one electrolytic capacitor 81 is two, but may be one or three or more. The electrolytic capacitors 81 are desirably disposed nearer to an outer periphery, more specifically an outer periphery on a side away from the battery 80 (FIG. 1A), of the back surface 5B of the power board 5.

A terminal portion 52 to which a connector 58 for electrically connecting the power board 5 and the control board 6 is connected is disposed on the back surface 5B of the power board 5.

Figure 9C:
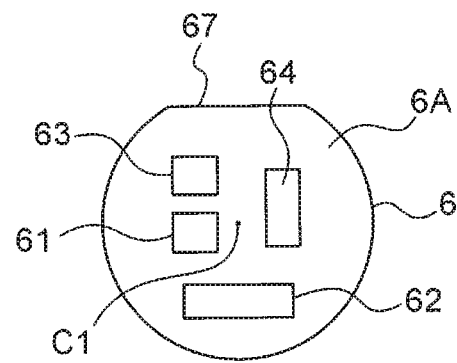

FIG. 9C is a schematic view illustrating an example of an arrangement of electronic parts on the front surface 6A (or a surface on the power board 5 side) of the control board 6. A MOSFET 64, an operational amplifier 63, and a logic IC 61 are disposed on the front surface 6A of the control board 6. Although omitted in FIG. 7, they are used for control of the motor 100.

A terminal portion 62 to which the connector 58 is connected is also disposed on the front surface 6A of the control board 6. The control power generator 83 (FIG. 7) may also be disposed on the front surface 6A of the control board 6.

Figure 9D:
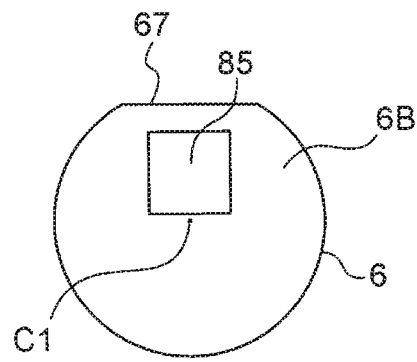

FIG. 9D is a schematic view illustrating an example of an arrangement of electronic parts on the back surface 6B (or a surface on a side opposite the power board 5) of the control board 6. The microcomputer 85 is disposed on the back surface 6B of the control board 6.

<Operation>

Figure 10:
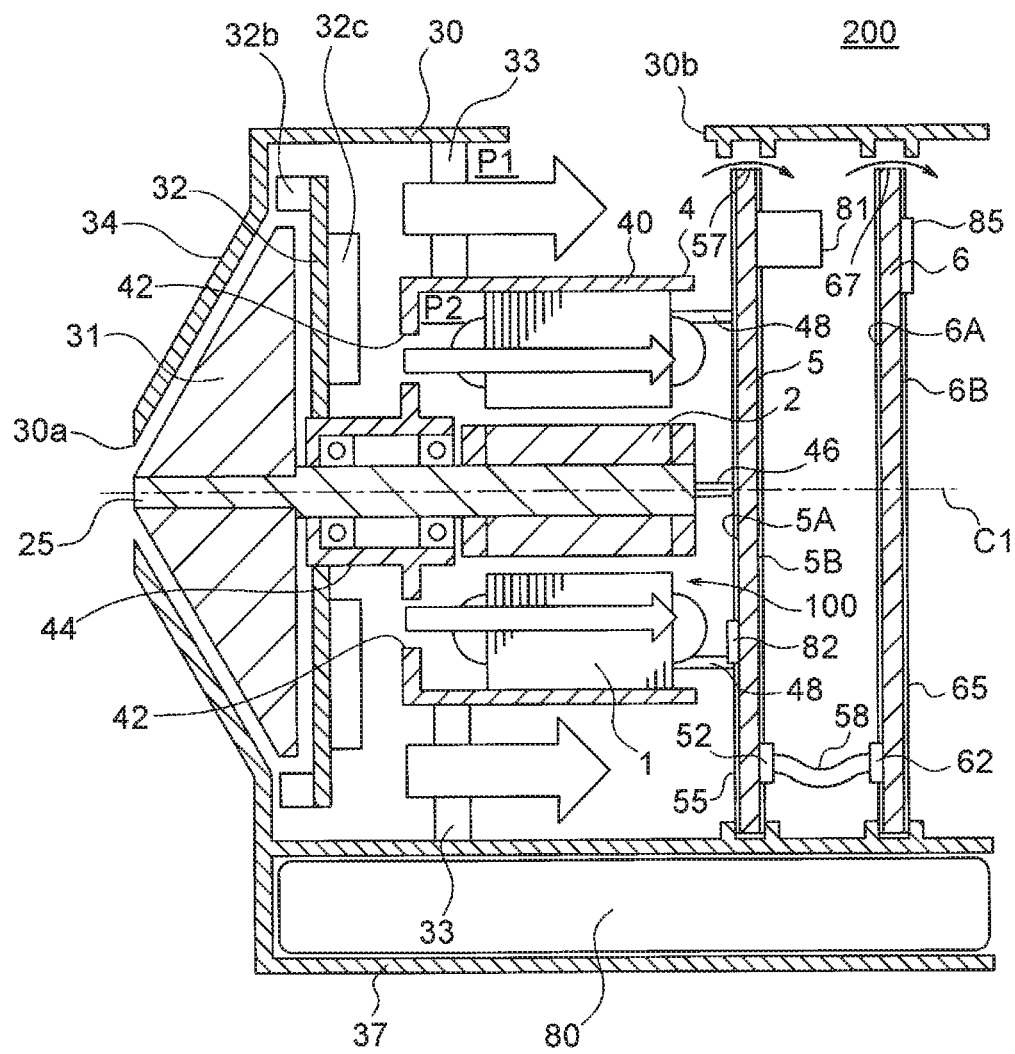
FIG. 10 is a schematic view illustrating airflow in the electric blower of the first embodiment.

Next, operation of the electric blower 200 of the first embodiment will be described. FIG. 10 is a view illustrating airflow in the electric blower 200. When the motor 100 is rotated by energization of the coil 18, the rotating shaft 25 rotates, and the rotor 31 rotates. When the rotor 31 rotates, air flows into the housing 30 through the inlet 30a.

Figure 11A:
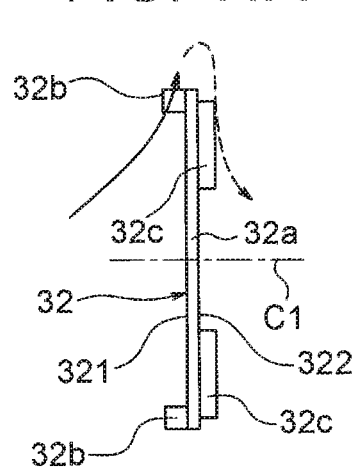
FIGS. 11A and 11B are respectively a side view and a front view illustrating an air guiding effect by the stator of the electric blower of the first embodiment.
Figure 11B:
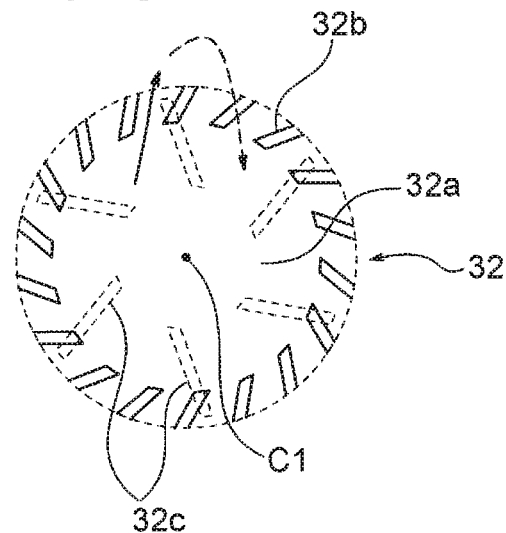

FIGS. 11A and 11B are respectively a side view and a front view from the rotor 31 side that illustrate operation of the stator 32. As illustrated in FIGS. 11A and 11B, the blades 32b of the stator 32 rectify airflow (indicated by the solid arrows) flowing along the rotor 31 and guide it outward in the radial direction. On the other hand, the air guide plates 32c of the stator 32 guide airflow passing through the blades 32b inward in the radial direction as indicated by the dashed arrows.

Thus, as illustrated in FIG. 10, a part of the airflow passing through the stator 32 flows through the first airflow path P1 outside the motor frame 4 in the axial direction. Also, another part of the airflow passing through the stator 32 is guided by the air guide plates 32c of the stator 32 inward in the radial direction, flows into the motor frame 4 through the hole 42, and flows through the second airflow path P2 in the axial direction.

The airflow flowing into the motor frame 4 flows in the axial direction through gaps 19 between the stator 1 and the stator housing portion 40, the insides of the respective slots 13 of the stator 1, and the air gap between the stator 1 and the rotor 2, which are illustrated in FIG. 6. Thus, heat generated by the coil 18 can be dissipated by the airflow flowing through the second airflow path P2.

Further, the airflows flowing through the first airflow path P1 and second airflow path P2 (or the outside of the motor frame 4 and the inside of the motor 100) strike the front surface 5A of the power board 5 and cool the switching elements 82*a* to 82*d* and shunt resistors 84 (FIG. 9A) or the like disposed on the front surface 5A.

The switching elements 82*a* to 82*d* and shunt resistors 84 are electronic parts that generate large amounts of heat and tend to increase in temperature. Thus, they can be effectively cooled by exposing them directly to the airflows flowing through the first airflow path P1 and second airflow path P2.

Figure 12:
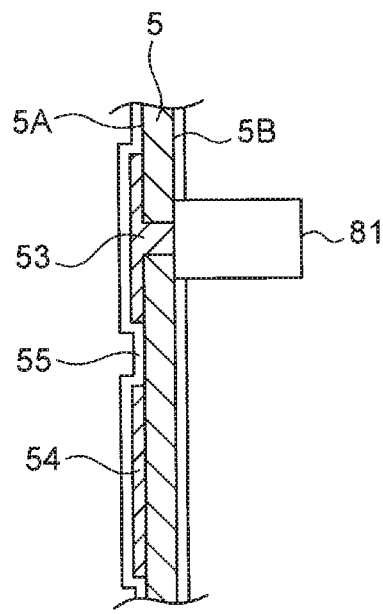
FIG. 12 is a view illustrating a sectional structure of the power board of the first embodiment.

As illustrated in FIG. 12, a ground pattern 54 having a large area may be disposed on the front surface 5A of the power board 5. Since a high current flows into the ground pattern 54, which generates a large amount of heat, it can be effectively cooled by exposing it to the airflows flowing through the first airflow path P1 and second airflow path P2.

Returning to FIG. 10, airflow striking the front surface 5A of the power board 5 is directed outward in the radial direction. While much of the airflow directed outward in the radial direction on the front surface 5A of the power board 5 is exhausted through the outlet 30*b*, part thereof enters the back surface 5B side through the cutout 57 of the power board 5.

The airflow entering the back surface 5B side of the power board 5 cools the electrolytic capacitors 81 disposed on the back surface 5B. The lifetimes of the electrolytic capacitors 81 tend to decrease at high temperature, and heights (here, dimensions in the axial direction) of the electrolytic capacitors 81 are relatively high. Thus, if the electrolytic capacitors 81 are disposed on the front surface 5A of the power board 5, they are too close to the motor 100, and can be affected by heat from the motor 100.

By disposing the electrolytic capacitors 81 on the back surface 5B of the power board 5, it is possible to prevent the electrolytic capacitors 81 from being affected by heat from the motor 100 and cool the electrolytic capacitors 81 with the airflow passing through the cutout 57 of the power board 5.

To improve the effect of cooling of the electrolytic capacitors 81, a wiring pattern 53 may be disposed on the front surface 5A of the power board 5 and connected to the electrolytic capacitors 81 through a through hole formed in the power board 5, as illustrated in FIG. 12. Since the wiring pattern 53 is cooled by the airflows flowing through the first airflow path P1 and second airflow path P2, heat from the electrolytic capacitors 81 can be dissipated through the wiring pattern 53.

Returning to FIG. 10, part of the airflow passing through the cutout 57 of the power board 5 strikes the front surface 6A of the control board 6 and cools the MOSFET 64, operational amplifier 63, and logic IC 61 (FIG. 9C) disposed on the front surface 6A.

Also, part of the airflow passing through the cutout 57 of the power board 5 enters the back surface 6B side of the control board 6 through the cutout 67 of the control board 6. The airflow entering the back surface 6B side of the control board 6 cools the microcomputer 85 disposed on the back surface 6B.

The microcomputer 85, MOSFET 64, operational amplifier 63, and logic IC 61 are each an electronic part that is applied with a low voltage and carries a low current, and thus generates a small amount of heat. Since these electronic parts each have a wiring pitch that is narrow, e.g., about 0.5 mm, it is required to prevent adhesion of foreign matter (especially liquid) to them. On the other hand, when the electric blower 200 is used in a vacuum cleaner 300 (FIG. 16), liquid can enter it through the inlet 30*a* together with airflow.

In this embodiment, electronic parts (or narrow-pitch parts) such as the microcomputer 85, MOSFET 64, operational amplifier 63, and logic IC 61 are disposed in the control board 6 downstream of the power board 5, not in the power board 5, which is exposed directly to the airflows flowing through the first airflow path P1 and second airflow path P2. Thus, it is possible to prevent adhesion of foreign matter to the electronic parts on the control board 6, and prevent dielectric breakdown, or corrosion and wire breakage.

In addition to this, the power board 5 and control board 6 are coated with the coatings 55 and 65 of moisture proof material, and thus it is possible to more effectively prevent adhesion of foreign matter to portions between wiring patterns or between wires of electronic parts, and prevent dielectric breakdown, or corrosion and wire breakage.

The switching elements 82*a* to 82*d* disposed on the power board 5 have wider wiring pitches than the microcomputer 85 or the like. Thus, even if the coating 55 is not provided on the power board 5, dielectric breakdown or corrosion and wire breakage due to adhesion of foreign matter does not easily occur.

When the coating 55 of moisture proof material is provided on the power board 5, the efficiency of heat dissipation from the power board 5 is lower than when the coating 55 is not provided. However, since the power board 5 is exposed directly to the airflows flowing through the first airflow path P1 and second airflow path P2 as described above, sufficient cooling efficiency can be achieved.

Here, the coating 55 is provided on the front surface 5A and back surface 5B of the power board 5, and the coating 65 is provided on the front surface 6A and back surface 6B of the control board 6. However, it is sufficient that the coating 55 be formed at least on the front surface 5A of the power board 5. This is because the back surface 5B of the power board 5 and the control board 6 are not exposed directly to the airflows flowing through the first airflow path P1 and second airflow path P2, and foreign matter does not easily reach the back surface 5B of the power board 5 and the control board 6.

Further, since the power board 5 and motor 100 are connected by the connecting terminals 48 made of conductor and the connecting terminals 48 are also exposed to the airflows flowing through the first airflow path P1 and second airflow path P2, heat from the power board 5 can also be dissipated through the connecting terminals 48.

Further, since the sensor guide 46 is equidistant from the adjacent connecting terminals 48*a* and 48*c* in the power board 5, even when the motor 100 or power board 5 is subjected to stress, the sensor 16 (FIG. 4), which is disposed at the tip of the sensor guide 46, can be prevented from displacing in the circumferential direction.

Since the positional accuracy of the sensor 16 in the circumferential direction affects detection of the positions of the magnetic poles of the rotor 2 (or a rotational position of the rotor 2), preventing displacement of the sensor 16 in the circumferential direction improves the accuracy in rotation of the rotor 2. Thus, it becomes possible to stably operate the motor 100, and it is possible to improve the performance of the electric blower 200.

Figure 13:
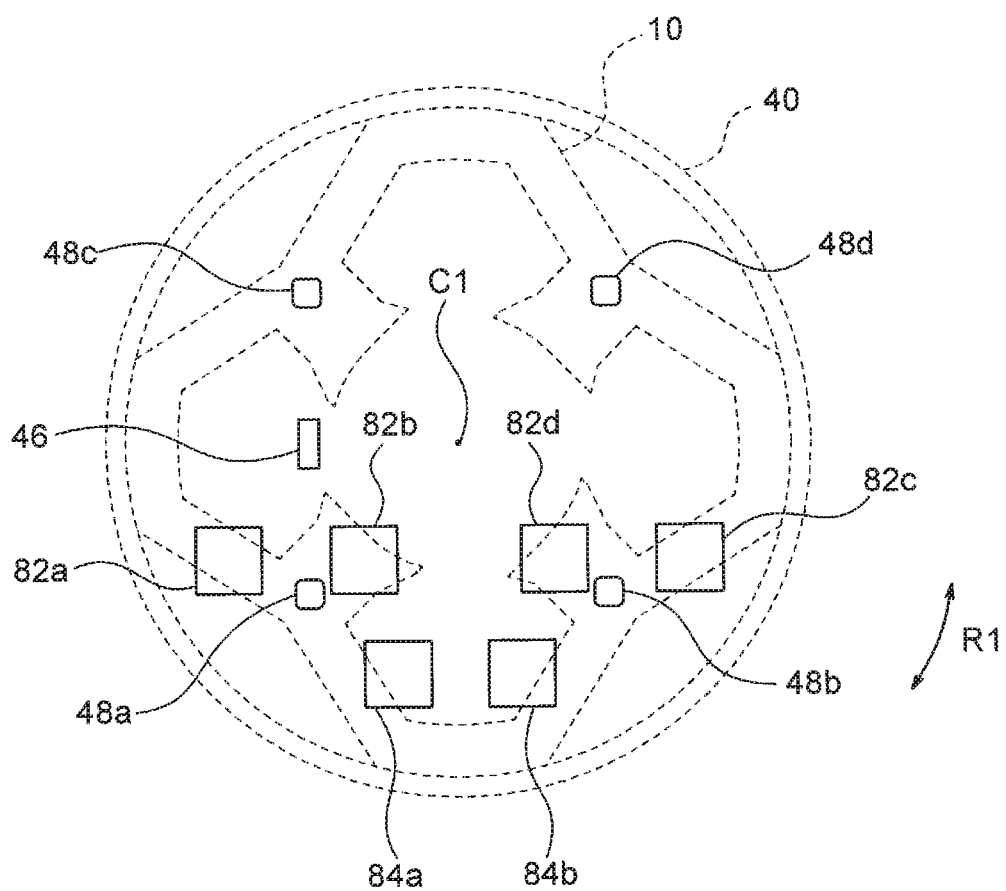
FIG. 13 is a schematic view illustrating an arrangement of electronic parts on the front surface of the power board of the first embodiment.

Next, a positional relationship between the switching elements 82a to 82d of the inverter 82 and the shunt resistors 84 will be described. FIG. 13 is a schematic view illustrating an arrangement of the switching elements 82a to 82d, shunt resistors 84, connecting terminals 48a to 48d, and sensor guide 46 on the front surface 5A of the power board 5. Here, the two shunt resistors 84 are denoted by reference characters 84a and 84b.

In this embodiment, a wiring length (a length through which current flows) from the connecting terminal 48a to the switching element 82b is equal to a wiring length from the connecting terminal 48b to the switching element 82d. Also, a wiring length from the connecting terminal 48a to the shunt resistor 84a is equal to a wiring length from the connecting terminal 48b to the shunt resistor 84b.

Figure 14A:
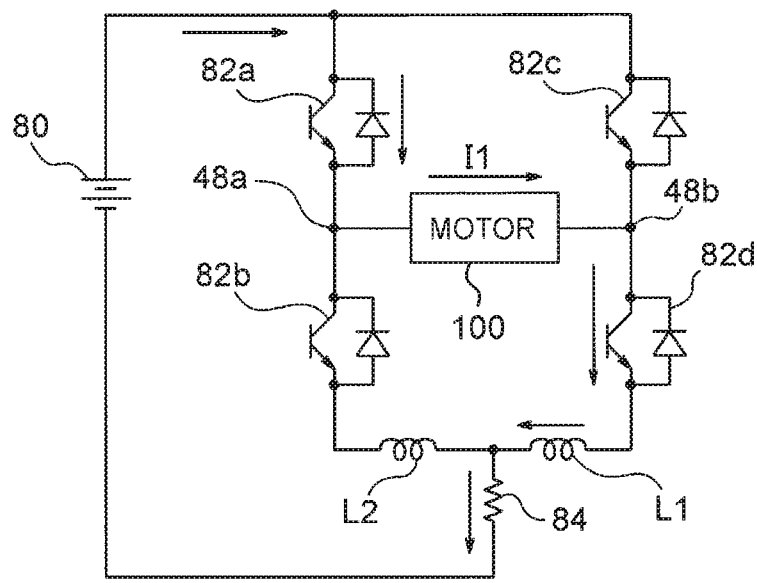
FIG. 14A is a diagram illustrating a state in which current flows through the motor in a first direction in the first embodiment.
Figure 14B:
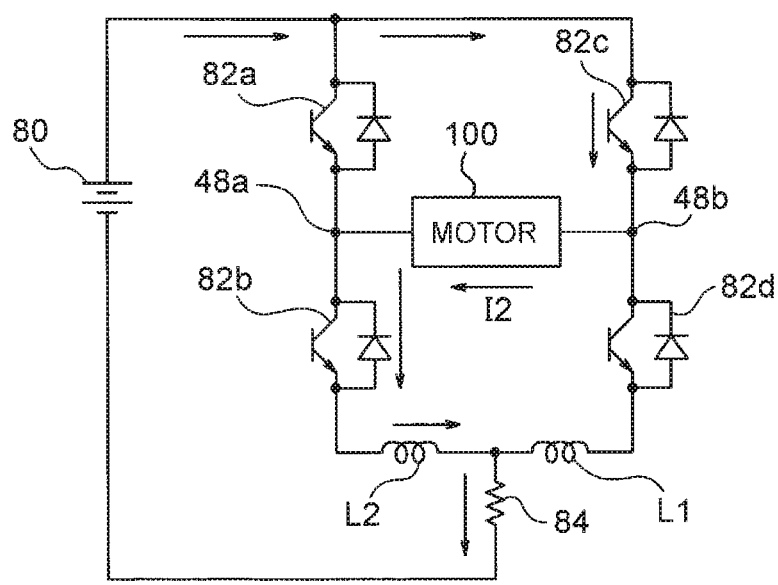
FIG. 14B is a diagram illustrating a state in which current flows through the motor in a second direction in the first embodiment.

FIGS. 14A and 14B are schematic diagrams illustrating flows of current passing through the switching elements 82a to 82d, motor 100, and shunt resistors 84. The electrolytic capacitors 81 are omitted. When the switching elements 82a and 82d are simultaneously turned on, current from the battery 80 passes through the switching element 82a, motor 100, switching element 82d, and shunt resistors 84 and returns to the battery 80, as illustrated in FIG. 14A. This current path will be referred to as the path I1.

When the switching elements 82b and 82c are simultaneously turned on, current from the battery 80 passes through the switching element 82c, motor 100, switching element 82b, and shunt resistors 84 and returns to the battery 80, as illustrated in FIG. 14B. This current path will be referred to as the path I2.

As described above, the wiring length from the connecting terminal 48a to the switching element 82b is equal to the wiring length from the connecting terminal 48b to the switching element 82d, and the wiring length from the connecting terminal 48a to the shunt resistor 84a is equal to the wiring length from the connecting terminal 48b to the shunt resistor 84b. Thereby, a wiring impedance L1 when current flows through the path I1 of FIG. 14A is equal to a wiring impedance L2 when current flows through the path I2 of FIG. 14B.

Figure 15:
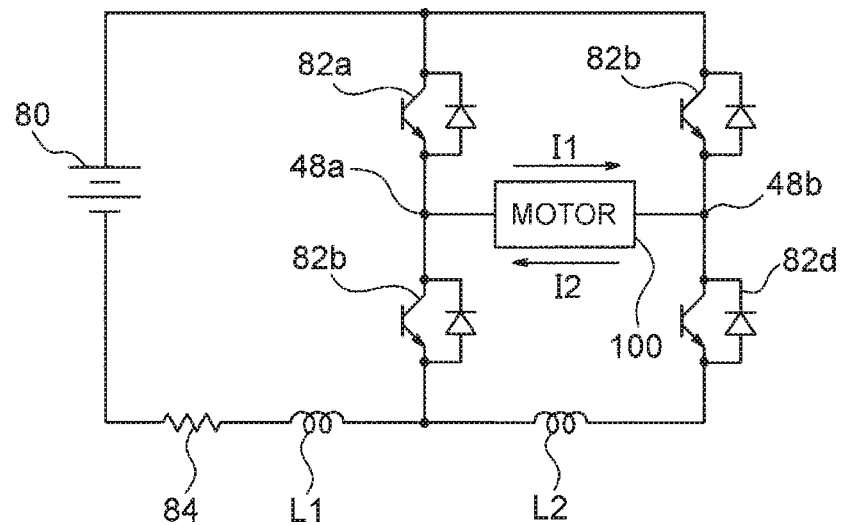
FIG. 15 is a diagram illustrating a state in which current flows through a motor in first and second directions, in a comparative example.

FIG. 15 illustrates a comparative example in which the wiring length from the connecting terminal 48a to the shunt resistor 84a is shorter than the wiring length from the connecting terminal 48b to the shunt resistor 84b. In this comparative example, the wiring impedance (L1+L2) when current flows through the path I1 is greater than the wiring impedance (L) when current flows through the path I2. When the wiring impedance varies depending on the path through which current flows, as described above, the operation of the motor 100 is unbalanced, and noise or vibration is likely to occur. In particular, as the overall wiring impedance of the motor decreases, the effect of variation in the wiring impedance depending on the path through which current flows is more likely to appear.

On the other hand, in this embodiment, as described with reference to FIGS. 14A and 14B, since the two paths I1 and I2 have the same wiring impedance, it is possible to prevent unbalance in operation of the motor 100, thereby reducing noise and vibration.

Since the shunt resistors 84 have a small resistance value (e.g., a few milliohms to a few tens of milliohms), they are more affected by the wiring impedance as the wiring length increases. If the voltage due to current flowing through the shunt resistors 84 is not accurately detected by the voltage sensor 93, the shut-off circuit 86 (FIG. 7) for overcurrent protection can fail to operate normally. Also, as the wiring length increases, it becomes more likely that a voltage drop due to flow of current and an oscillation phenomenon (ringing) of voltage or current due to an inductance of wiring or a stray capacitance between wirings occur, and stoppage of operation of the motor 100 due to false detection by the voltage sensor 93 occurs.

Thus, it is desirable to make the wiring impedance L1 when current flows through the path I1 and the wiring impedance L2 when current flows through the path I2 equal to each other and make each of the wiring lengths as short as possible.

Advantages of Embodiment

As described above, in the electric blower 200 of the first embodiment, the motor 100, power board 5 (first board), and control board 6 (second board) are arranged in this order in a blowing direction of the rotor 31 (fan). Also, the power board 5 includes the switching elements 82a to 82d, and the control board 6 includes the microcomputer 85. Thus, it is possible to expose the switching elements 82a to 82d, which generate a large amount of heat, to the airflow blown by the rotor 31 and passing through the motor 100 and cool them efficiently. Also, by disposing the microcomputer 85, which generates a small amount of heat and has a narrow wiring pitch, in the control board 6 downstream of the power board 5, it is possible to prevent adhesion of liquid to the microcomputer 85, thereby preventing dielectric breakdown, and corrosion and wire breakage.

Further, by disposing the electrolytic capacitors 81 on the back surface 5B of the power board 5, it is possible to cool the electrolytic capacitors 81 with the airflow traveling from the front surface 5A to the back surface 5B of the power board 5. Also, if the electrolytic capacitors 81 are disposed on the front surface 5A of the power board 5, the electrolytic capacitors 81 are close to the motor 100. In contrast, by disposing the electrolytic capacitors 81 on the back surface 5B of the power board 5, it is possible to ensure the distance between the electrolytic capacitors 81 and the motor 100, and reduce the effect of heat from the motor 100 on the electrolytic capacitors 81.

Further, by disposing the shunt resistors 84 on the power board 5, it is possible to expose the shunt resistors 84, which generate a large amount of heat, to the airflow blown by the rotor 31 and passing through the inside and outside of the motor 100 (i.e., the airflow passing through the airflow paths P1 and P2) and cool them efficiently.

Further, by providing the connecting terminals 48a to 48d that connect the power board 5 and motor 100, it is possible to electrically connect the power board 5 and motor 100, and position the power board 5 relative to the motor 100.

Further, of the switching elements 82a to 82d, the switching element 82b (first switching element) is connected to the connecting terminal 48a (first connecting terminal) and the shunt resistors 84, and the switching element 82d (second switching element) is connected to the connecting terminal 48b (second connecting terminal) and the shunt resistors 84. The wiring length from the connecting terminal 48a to the switching element 82b is equal to the wiring length from the connecting terminal 48b to the switching element 82d, and the wiring length from the connecting terminal 48a to the shunt resistors 84 is equal to the wiring length from the connecting terminal 48b to the shunt resistors 84.

Thereby, the wiring impedance when current flows through the motor 100 and shunt resistors 84 via the switching element 82a (FIG. 14A) and the wiring impedance when current flows through the motor 100 and shunt resistors 84 via the switching element 82b (FIG. 14B) are equal. By eliminating variation in the impedance depending on the direction in which the current flows, it is possible to prevent unbalance in operation of the motor 100, thereby reducing noise and vibration and improving motor efficiency.

Further, the connecting terminals 48a to 48d that connect the power board 5 and motor 100, and the sensor 16 (magnetic pole position sensor) that detects the positions of the magnetic poles of the rotor 2 are disposed, and the sensor 16 is equidistant from the adjacent connecting terminals 48a and 48c. Thus, even when the motor 100 or power board 5 is subjected to stress, it is possible to prevent displacement of the sensor 16 in the circumferential direction. By preventing displacement of the sensor 16 in the circumferential direction, it is possible to improve the accuracy in the rotational position of the rotor 2.

Further, since the microcomputer 85 is disposed on the back surface 6B (or the surface on the side opposite the motor 100) of the control board 6, the microcomputer 85 is exposed to the air passing through the power board 5 and traveling from the front surface 6A to the back surface 6B of the control board 6. Thus, it is possible to prevent adhesion of foreign matter to the microcomputer 85, which has a narrow wiring pitch.

Further, since the coating 55 of moisture proof material is formed on at least the front surface 5A (or the surface facing the motor 100) of the power board 5, it is possible to prevent adhesion of foreign matter (especially liquid) to the switching elements 82a to 82d, a wiring pattern, and the like disposed on the front surface 5A, thereby preventing dielectric breakdown, or corrosion and wire breakage.

Further, since the connector 58 electrically connecting the power board 5 and control board 6 is further provided, the power board 5 and control board 6 can cooperate while communicating signals or the like with each other, and share processing required for drive of the motor 100.

Further, the electric blower 200 has the first airflow path P1 outside the motor frame 4 and the second airflow path P2 inside the motor frame 4, and the power board 5 faces the first airflow path P1 and second airflow path P2. Thus, it is possible to expose the power board 5 to a sufficient amount of airflow flowing through the first airflow path P1 and second airflow path P2, and cool the switching elements 82a to 82d or the like effectively.

Further, the motor 100 includes the rotor 2 and stator 1, and the above-described second airflow path P2 includes the air gap between the stator 1 and the rotor 2, the slots 13 of the stator 1, and the gaps 19 between the stator 1 and the stator housing portion 40. Thus, it is possible to cool the power board 5 and control board 6 with airflow passing through the air gap, slots 13, and gaps 19.

Further, since the air guide plates 32c (air guides) for guiding airflow generated by the rotor 31 (fan) to the second airflow path P2 is provided, it is possible to ensure a flow rate of the airflow flowing through the second airflow path P2. Thereby, it is possible to cool the power board 5 and control board 6 not only with the airflow flowing through the first airflow path P1 but also with the airflow flowing through the second airflow path P2.

Further, the motor 100 includes the rotating shaft 25, the rotor 31 (fan) is attached to the rotating shaft 25, and the axial direction of the rotating shaft 25 coincides with the blowing direction of the rotor 31. Thus, the rotor 31, motor 100, power board 5, and control board 6 are arranged in the axial direction of the rotating shaft 25. This allows reduction in the diameter of the electric blower 200 and improvement in the efficiency of cooling of the power board 5 and control board 6.

Further, the housing 30 that houses the rotor 31 (fan), motor 100, power board 5, and control board 6 is provided, and the power board 5 and control board 6 are fixed to the housing 30. Thus, even when outer diameters of the power board 5 and control board 6 are larger than an outer diameter of the motor 100, the power board 5 and control board 6 can be securely held by the housing 30.

<Vacuum Cleaner>

Figure 16:
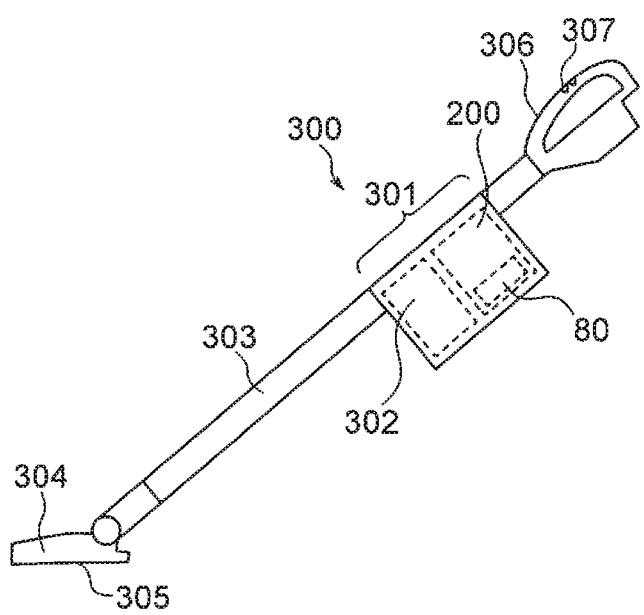
FIG. 16 is a view illustrating a vacuum cleaner to which the electric blower of the first embodiment is applied.

A vacuum cleaner to which the electric blower 200 of the first embodiment is applied will now be described. FIG. 16 is a schematic view illustrating the vacuum cleaner 300 using the electric blower 200 (FIG. 1A) of the first embodiment.

The vacuum cleaner 300 includes a cleaner body 301, a pipe 303 connected to the cleaner body 301, and a suction portion 304 connected to a tip of the pipe 303. A suction port 305 for sucking air containing dust is provided in the suction portion 304. A dust collection container 302 is disposed in the cleaner body 301.

The electric blower 200, which sucks air containing dust through the suction port 305 into the dust collection container 302, is disposed in the cleaner body 301. The electric blower 200 has, for example, the configuration illustrated in FIG. 1A. The cleaner body 301 is also provided with a grip 306 to be held by a user, and the grip 306 is provided with an operation portion 307, such as an on-off switch.

Figure 17:
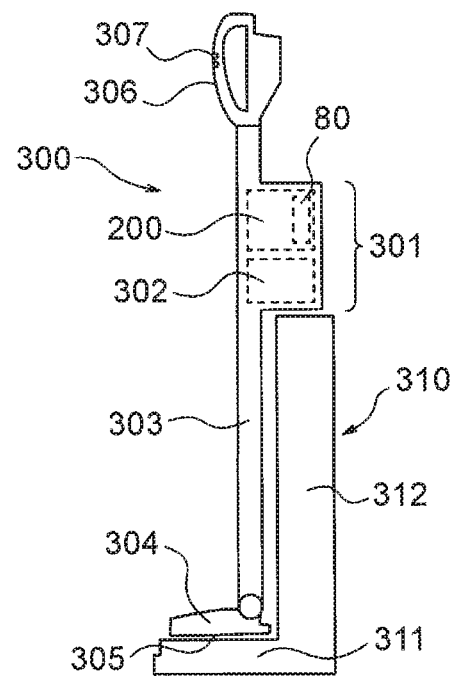
FIG. 17 is a view illustrating a state in which the vacuum cleaner illustrated in FIG. 16 is mounted on a stand.

FIG. 17 is a schematic view illustrating a state where the vacuum cleaner 300 is placed when it is not being used. When the vacuum cleaner 300 is not being used, it is placed on a stand 310 in a standing position. The stand 310 includes a base 311 and a support post 312 extending vertically upward from the base 311. The suction portion 304 of the vacuum cleaner 300 is placed on the base 311, and the cleaner body 301 is placed on an upper portion of the support post 312. The vacuum cleaner 300 is held on the stand 310 in such a manner that a direction in which the pipe 303 extends coincides with a vertical direction.

In using the vacuum cleaner 300, when a user holds the grip 306 and operates the operation portion 307, the electric blower 200 operates. When the electric blower 200 operates, the rotor 31 (FIG. 1A) is rotated by the motor 100 (FIG. 1A). This generates airflow (suction air), and dust is sucked together with air through the suction port 305 and pipe 303. The sucked dust is stored in the dust collection container 302. The airflow generated at this time flows through the first airflow path P1 and second airflow path P2 illustrated in FIG. 1A, cools the motor 100, and further cools the power board 5 and control board 6.

As described above, the vacuum cleaner 300 includes the suction portion 304 having the suction port 305, the dust collection container 302 that stores dust, and the electric blower 200 that sucks air containing dust through the suction portion 304 into the dust collection container 302. Since the electric blower 200 has high efficiency of cooling the power board 5 and control board 6 as described above, it is possible to improve the efficiency of operation of the vacuum cleaner 300. Also, since adhesion of foreign matter to the control board 6 is prevented as described above (which prevents malfunction of the electric blower 200), it is possible to improve the reliability of the vacuum cleaner 300.

<Hand Dryer>

Figure 18:
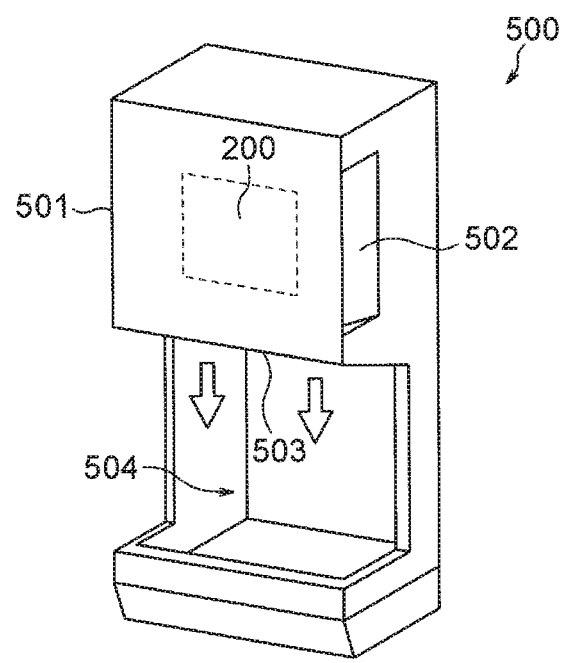
FIG. 18 is a view illustrating a hand dryer to which the electric blower of the first embodiment is applied.

A hand dryer to which the electric blower 200 of the first embodiment is applied will now be described. FIG. 18 is a schematic view illustrating a hand dryer 500 using the electric blower 200 of the first embodiment (FIG. 1A).

The hand dryer 500 includes a housing 501, and the electric blower 200, which is fixed in the housing 501. The electric blower 200 has, for example, the configuration illustrated in FIG. 1A. The housing 501 has an air inlet 502 and an air outlet 503, and has, under the air outlet 503, a hand insertion portion 504 into which a hand is inserted by a user. The electric blower 200 generates airflow, thereby sucking air outside the housing 501 through the air inlet 502 and blowing air to the hand insertion portion 504 through the air outlet 503.

When the hand dryer 500 is turned on, electric power is supplied to the electric blower 200, and the electric blower 200 operates. When the electric blower 200 operates, the rotor 31 (FIG. 1A) is rotated by the motor 100 (FIG. 1A). Thereby, air outside the housing 501 is sucked through the air inlet 502 and blown through the air outlet 503. When a user inserts a hand into the hand insertion portion 504, the air blown through the air outlet 503 can blow off or evaporate water droplets on the hand.

As described above, the hand dryer 500 includes the housing 501 having the air inlet 502, and the electric blower 200 that is disposed in the housing 501 and sucks air through the air inlet 502 and blows air through the air outlet 503. Since the electric blower 200 has high efficiency of cooling the power board 5 and control board 6 as described above, it is possible to improve the efficiency of operation of the hand dryer 500. Also, since adhesion of foreign matter to the control board 6 is prevented as described above (which prevents malfunction of the electric blower 200), it is possible to improve the reliability of the hand dryer 500.

While the preferred embodiment of the present invention has been specifically described above, the present invention is not limited to the above-described embodiment, and various modifications or changes can be made without departing from the gist of the present invention.

The invention claimed is:

1. An electric blower comprising:
   a fan;
   a motor to drive the fan;
   a first board including at least one switching element; and
   a second board including a microcomputer,
   wherein the motor, the first board, and the second board are arranged in this order in a blowing direction of the fan,
   wherein the first board is disposed of so that the first board is directly exposed to airflow blown from the fan,
   wherein the first board has a portion that allows the airflow to pass therethrough toward the second board, whereby the airflow blown from the fan reaches the first board and the second board,
   wherein the first board includes, on a surface on a side opposite the motor, an electrolytic capacitor,
   wherein the first board and the second board are arranged in an axial direction of the fan such that the airflow blown from the fan moves in the axial direction of the fan from an air inlet to the first board, after which the airflow
      passes through the portion of the first board that allows airflow to pass, and
      reaches the second board,
   wherein: the motor includes a frame, the electric blower includes a first airflow path outside the frame and a second airflow path inside the frame, and the first board faces the first airflow path and the second airflow path, and
   wherein:
   the motor further includes:
      a rotor; and
      a stator that
         is disposed to surround the rotor, including a plurality of slots in a circumferential direction of the rotor, and
         is fitted to an inner side of the frame, and
      the second airflow path includes an air gap between the rotor and the stator, the plurality of slots, and a gap between the stator and the frame.

2. The electric blower of claim 1,
wherein the first board further includes a shunt resistor.

3. The electric blower of claim 2, comprising
a first connecting terminal and a second connecting terminal that electrically connect the first board and the motor, wherein:
the at least one switching element includes a first switching element connected to the first connecting terminal and the shunt resistor, and a second switching element connected to the second connecting terminal and the shunt resistor,
a wiring length from the first connecting terminal to the first switching element is equal to a wiring length from the second connecting terminal to the second switching element, and
a wiring length from the first connecting terminal to the shunt resistor is equal to a wiring length from the second connecting terminal to the shunt resistor.

4. The electric blower of claim 2, comprising
a first connecting terminal and a second connecting terminal that electrically connect the first board and the motor, wherein:
the at least one switching element includes a first switching element connected to the first connecting terminal and the shunt resistor, and a second switching element connected to the second connecting terminal and the shunt resistor, and
a wiring impedance when current flows through the motor and the shunt resistor via the first switching element is equal to a wiring impedance when current flows through the motor and the shunt resistor via the second switching element.

5. The electric blower of claim 1, further comprising:
a plurality of connecting terminals that connect the first board and the motor; and
a magnetic pole position sensor to detect a position of a magnetic pole of the motor,
wherein the magnetic pole position sensor is equidistant from adjacent two of the plurality of connecting terminals.

6. The electric blower of claim 1,
wherein the microcomputer is provided on a surface of the second board on a side opposite the motor.

7. The electric blower of claim 1,
wherein a coating of moisture proof material is formed at least on a surface of the first board facing the motor.

8. The electric blower of claim 1, further comprising
a connector that electrically connects the first board and the second board.

9. The electric blower of claim 1, further comprising
an air guide to guide airflow generated by the fan to the second airflow path.

10. The electric blower of claim 1, wherein:
the motor includes a rotating shaft,
the fan is attached to the rotating shaft, and
the blowing direction of the fan is in an axial direction of the rotating shaft.

11. The electric blower of claim 1, further comprising
a housing that houses the fan, the motor, the first board, and the second board, wherein the first board and the second board are fixed to the housing.

12. A vacuum cleaner comprising:
a suction portion including a suction port;
a dust collection container to store dust; and
the electric blower of claim 1, the electric blower sucking air containing dust through the suction portion into the dust collection container.

13. A hand dryer comprising:
a housing including an air inlet and an air outlet; and
the electric blower of claim 1, the electric blower being disposed in the housing, and sucking air through the air inlet and blowing air through the air outlet.

14. The electric blower of claim 1,
wherein the electrolytic capacitor, disposed on the surface of the first board opposite to the motor, is also opposite to the blowing direction of the fan, which is an axial direction of the fan toward the first board.

\* \* \* \* \*